(12) United States Patent
Henderson

(10) Patent No.: US 6,845,892 B2
(45) Date of Patent: Jan. 25, 2005

(54) INTEGRALLY FORMED ROOF RACK

(75) Inventor: Jack V. Henderson, West Bloomfield, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/203,042

(22) PCT Filed: Feb. 5, 2001

(86) PCT No.: PCT/CA01/00131

§ 371 (c)(1),
(2), (4) Date: Sep. 26, 2003

(87) PCT Pub. No.: WO01/56836

PCT Pub. Date: Aug. 9, 2001

(65) Prior Publication Data

US 2004/0031831 A1 Feb. 19, 2004

Related U.S. Application Data

(60) Provisional application No. 60/180,431, filed on Feb. 4, 2000.

(51) Int. Cl.[7] .................................................. B60R 9/05
(52) U.S. Cl. ....................... 224/316; 224/321; 296/37.7
(58) Field of Search ................................. 224/316, 321, 224/327; 296/37.7

(56) References Cited

U.S. PATENT DOCUMENTS

| | | | | |
|---|---|---|---|---|
| 5,090,605 A | * | 2/1992 | Cucheran | 224/321 |
| 5,549,229 A | * | 8/1996 | Grabowski | 224/321 |
| 5,975,391 A | * | 11/1999 | Aftanas et al. | 224/309 |
| 6,216,928 B1 | * | 4/2001 | Blankenburg et al. | 224/321 |
| 6,305,740 B1 | * | 10/2001 | Staser et al. | 296/222 |
| 6,568,748 B2 | * | 5/2003 | Yoon | 296/210 |

FOREIGN PATENT DOCUMENTS

| | | |
|---|---|---|
| DE | 3429 880 A1 | 2/1986 |
| FR | 1 092 594 | 11/1953 |
| FR | 2589 813 | 11/1985 |
| FR | 2 632 595 A | 12/1989 |
| GB | 820047 | 9/1959 |
| GB | 2 048 802 A | 4/1980 |

* cited by examiner

Primary Examiner—Stephen K. Cronin
(74) Attorney, Agent, or Firm—Clark Hill PLC

(57) ABSTRACT

A vehicle roof panel includes a roof portion and roof rack portion with an integrally embossed portion defined by longitudinally extending spaced apart side portions. A side rail is attached to each of the side portions. A cross member has connectors for selectively and slidably interconnecting to the side rail thereby retaining the cross member elevated above the planar surface of the roof panel.

11 Claims, 2 Drawing Sheets

INTEGRALLY FORMED ROOF RACK

This application claims the benefit of Provisional Application No. 60/180,431, filed on Feb. 4, 2000.

BACKGROUND OF THE INVENTION

1. Field of Invention

The present invention relates to an automotive roof panel. More particularly, the present invention relates to an automotive roof panel having an integrally formed roof rack portion.

2. Description of the Related Art

Minivans and sport utility vehicles are commonly purchased from the factory with a luggage or sport rack mounted on the roof of the vehicle. Currently, the roof racks are separate components from the vehicle body and must be assembled either as a separate operation in the factory, or at the dealer, prior to delivery to the customer. An example of such a roof rack is illustrated in U.S. Pat. No. 5,924,614.

Additionally, current roof racks are only available in black. No attempts have been made to color coordinate the roof rack with the color of the vehicle.

The typical roof rack structure is a separate assembly that requires piercing the roof panel structure to attach the roof rack, thereby, allowing a possible ingress for water or other material.

Therefore, it is desirable to produce a one piece roof panel for an automobile that has a roof rack portion molded into the roof panel.

SUMMARY OF THE INVENTION

The disadvantages of the prior art may be overcome by providing a roof panel with an integrally molded roof rack.

It is desirable to simplify the manufacturing steps required to produce an automobile roof panel with a roof rack, by negating the need to attach a separate roof rack assembly.

According to one aspect of the invention, there is provided a vehicle roof panel assembly comprising a one piece panel having a generally planar surface and an embossed portion defined by longitudinally extending and generally parallel, spaced apart, side portions. At least one connector is coupled to each of the side portions and at least one cross member extends transversely between the side portions and is coupled to each of the connectors. The side portions and the connectors elevate and retain the cross member above the planar surface of the roof panel.

DETAILED DESCRIPTION OF THE PREFERRED EMBODIMENT

Figure 1:
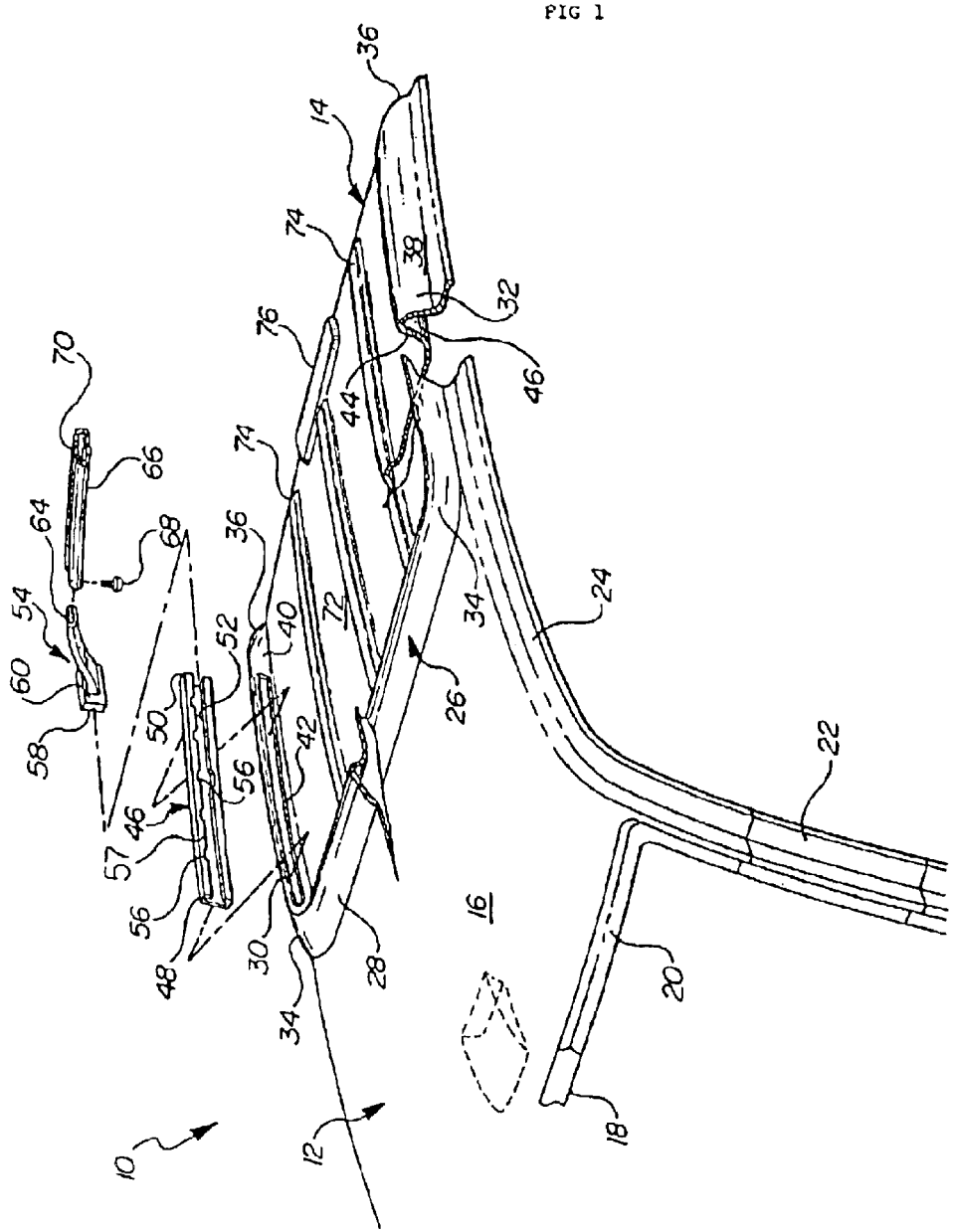
FIG. 1 is a partially broken perspective view of a roof panel assembly incorporating the aspects of the present invention.

Referring to FIG. 1 there is shown a roof panel assembly, generally denoted at 10. The roof panel 10 is preferably formed of a solid body, one piece long-fiber reinforced thermoplastic, such as reinforced polypropylene or thermo-set plastic. However, it is also possible to die stamp sheet metal in accordance with the present invention.

The roof panel 10 includes a roof portion 12 and a roof rack portion 14. The roof portion 12 includes a generally smooth planar area 16 with an appropriate curvature or contour, according to the vehicle design and specifications, which terminates at the front at a windshield opening 18.

The windshield opening 18 is provided with an appropriate flange structure 20 such that a glass windshield and seal can be mounted flush with the roof panel 10. In the illustrated embodiment, the roof portion 12 includes a pillar portion 22 for integrating and connecting with the structural A-pillar of the vehicle.

It is to be understood that the pillar portion 22 can be removed from the roof portion 12, approximately along a line extended from the windshield opening 18, providing a roof portion 12 that does not include a pillar portion 22.

The roof portion 12 is bounded on its outer peripheral sides by an attachment flange 24 that circumferentially surrounds the entire roof panel 10, except for region adjacent to the windshield opening 18. The attachment flange 24 is provided to allow an area to attach the roof panel 10 to the underlying roof structure as well as to provide a location for other body panels to intersect with the roof panel 10.

The roof rack portion 14 includes a raised or embossed portion 26 defining the periphery of the roof rack portion 14. In the illustrated embodiment, the raised portion 26 has a front section 28 and two spaced apart, generally parallel and opposing side sections 30, 32 defining the roof rack portion 14. It is to be understood that a fourth rear section, can be utilized should the roof rack portion 14 not be located at the rear most end of the roof panel 10. The fourth rear section, if included, would complete the boundary of the roof rack portion 14. Alternatively, the roof rack portion 14 could include only the two side sections 30, 32.

Each raised side portion 30, 32 projects upwardly from the planar surface 16 of the roof portion 12 and extending longitudinally between opposite first and second ends 34, 36. Each raised side portion 30, 32 further includes an outside surface 38 and an inside surface 40. The outside surface 38 has an appropriate radius of curvature to provide an aerodynamic transition to the roof portion 12 and the attachment flange 24. An appropriate radius is based on the aesthetics of the roof rack design as well as other considerations, such as, the necessary height of the raised portion 26, and the appropriate wind resistance qualities of the raised portion 26.

The inside surface 40 provides a transition to the roof rack portion 14. The interior surface 40 of the two side portions 30, 32 have integrally formed pockets 42, 44 created or recessed therein for receiving and securing a side rail 46 to each of the side portions 30, 32. The pockets 42, 44 define an elongated channel having a generally U-shaped cross-section and extending between the first and second ends 34, 36 of the side portions 30, 32.

Figure 2:
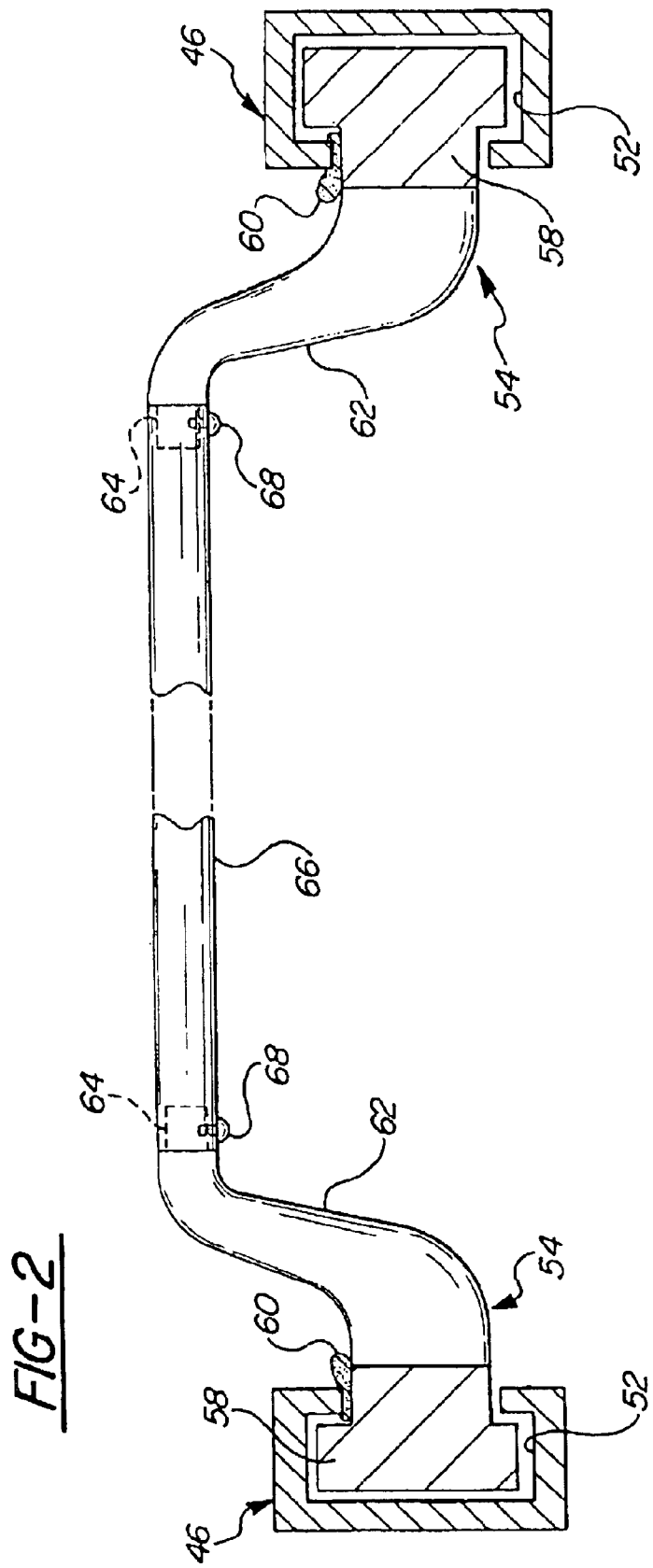
FIG. 2 is a partially broken cross-sectional view of the side rails, connectors and cross member of the roof panel assembly.

Referring to FIGS. 1 and 2, the side rail 46 is preferably formed of metal to withstand the wear and forces placed upon it during use. Each side rail 46 extends longitudinally between opposing first and second ends 48, 50 and has a generally C-shaped cross section with a channel 52 formed therein for receiving a connector 54. The side rails 46 further include a plurality of spaced apart notches, or slots, 56 formed in either the top or bottom edge of the channel defining an adjustment boundary 57 therebetween to positively locate and secure connector 54 to the side rail 46. The side rails 46 can be molded into the pockets 42, 44 during the molding operations or the side rails 46 may be attached or bonded inside the pockets 42, 44 after the roof panel has been formed.

A connector 54 is designed to slidably engage each of the respective side rails 46 via the channel 52 to allow for slidable movement of the connector 54 between the first and second ends 48, 50 of the side rails 46. The connector 54 includes a rail engagement portion 58 having a generally T-shaped cross section for corresponding mating engagement within the C-shaped channel 52 to facilitate the sliding engagement of the connector 54 with the side rail 46. Further, the rail engagement portion 58 includes a spring bias locking tab 60 for engaging one of the notches 56 in the side rail 46, to positively lock the connector 54 in place along the longitudinal length of the side rail 46.

The connector 54 further includes an arcuate shaped extension neck portion 62 extending outwardly from the rail engagement portion 58 and terminating at a distal cross bar engagement portion 64. The engagement portion 64 is generally rectangular in cross section and stepped down from the neck portion 62 forming a male end fitting. The neck portion 62 and the engagement portion 64 are designed to allow attachment of an elongated cross bar 66 that transversely extends across the roof rack portion 14 and between the side rails 46 in the opposing side sections 30, 32. The cross bar 66 extends between opposite distal ends and includes a generally hollow rectangular or oval cross sectional shape. The engagement portion 64 is received in ends of the cross bar 66 in a telescoping male/female type arrangement. The cross bar 66 may be fixedly attached to the connectors 54 by any type of fastener 68, such as a screw, as depicted in the drawing, or may be attached using other conventional means, including rivets, lock pins, or the like.

The cross bar 66 is preferably made of metal and has a slot 70 formed in the center of the top surface thereof extending the length of the cross bar 66. The slot 70 allows for the attachment of accessories to the roof rack, such as a bicycle rack, ski rack or other similar devices. The roof panel 10, and specifically, the roof rack portion 14 may include one or more cross bars 66 slidably coupled between the side sections 30, 32 via the connectors 54 in a parallel arrangement.

The roof rack portion 14 further includes a generally planar central portion 72 that is within the interior periphery defined by the raised portion 26. The central portion 72 has a plurality of spaced apart and generally parallel raised skid channels 74 formed therein to provide a skid plate or raised area such that items placed in the roof rack portion 14 will not rub on the central portion 72. The raised skid channels 74 also serve to strengthen the roof rack portion 14 and provide heightened rigidity to support the forces exerted upon it when carrying an item.

The roof rack portion 14 also includes a brake light platform 76 on which a central or third brake light (CHMSL) that is required on most vehicles can be mounted. It is to be understood that the roof rack portion 14 can be formed without the brake light platform 76.

In use, the cross bars 66 are slidably adjustable along the side rails 46 by depressing or releasing the locking tabs 60 and moving the opposing connectors 54 to desired corresponding locations on the opposing side rails 46 defined by the notches 56. The locking tabs 60 are then released to engage with a corresponding notch 56 to lock the connectors 54 in place along the side rails 46. In this manner, the spacing of the cross bars 66 can be customized to accommodate a multitude of orientations for various uses.

While the invention has been illustrated in detail in the drawings and in the foregoing description, the same is to be considered as illustrative and not restrictive in nature. It is understood that only the preferred embodiments have been shown and described fully and that all changes and modifications that come within the spirit of the invention are desired to be protected.

Thus, it is to be appreciated from the preceding disclosures that there has been described a roof panel having an integrally formed roof rack portion.

What is claimed is:

1. A vehicle roof panel assembly comprising:

an integrally formed one piece panel having a generally planar surface and an embossed portion defined by longitudinally extending and generally parallel, spaced apart side portions;

at least one connector coupled to each of said side portions;

at least one cross member extending transversely between said side portions and coupled to said connectors, wherein said side portions and said connectors space said cross member from said planar surface;

an elongated side rail fixedly attached to each of said side portions for slidably connecting said cross member and said connectors to said side portions; and an elongated pocket forming a recessed channel in each of said side portions for receiving and supporting said side rail.

2. A vehicle roof panel assembly as set forth in claim 1 wherein said connectors are slidably coupled to said respective side portion for providing selective sliding adjustment of said cross member along the longitudinal length of said side portions.

3. A vehicle roof panel assembly as set forth in claim 2 wherein each of said side portions includes an inside surface spaced apart from an outside surface, said elongated pocket formed in said inside surface for receiving said side rail and slidably connecting said cross member and said connectors to said side portions.

4. A vehicle roof panel assembly as set forth in claim 3 wherein each of said elongated pockets includes a generally U-shaped cross-section defining said recessed channel for receiving and supporting said side rail.

5. A vehicle roof panel assembly as set forth in claim 4 wherein said side rail includes a generally C-shaped cross-section defining an elongated channel and said connector includes a rail engagement portion having a generally T-shaped cross-section for sliding and interlocking engagement in said channel of said side rail.

6. A vehicle roof panel assembly as set forth in claim 5 wherein said side rail includes a plurality of spaced apart notches therein for cooperative engagement with a locking tab coupled to said connector for releasably locking said connector along said side rail.

7. A vehicle roof panel assembly as set forth in claim 6 wherein each of said connectors includes an extension neck portion extending from said rail engagement portion from said channel for supporting said cross member above said planar surface of said roof panel.

8. A vehicle roof panel assembly as set forth in claim 7 wherein said roof panel assembly includes a roof portion defined by said planar surface and a roof rack portion defined by said embossed side portions.

9. A vehicle roof panel assembly as set forth in claim 8 wherein said roof panel assembly includes a plurality of spaced apart and generally parallel raised skid channels protruding from said planar surface.

10. A vehicle roof panel assembly as set forth in claim 9 wherein said roof panel is formed of a solid long-fiber reinforced thermoplastic.

11. A vehicle roof panel assembly as set forth in claim 9 wherein said roof panel is formed of a stamped sheet metal.

* * * * *